(12) United States Patent
Carlblom et al.

(10) Patent No.: US 6,309,757 B1
(45) Date of Patent: Oct. 30, 2001

(54) GAS BARRIER COATING OF POLYAMINE, POLYEPOXIDE AND HYDROXYAROMATIC COMPOUND

(75) Inventors: Leland H. Carlblom, Gibsonia; Cynthia Kutchko, Pittsburgh; Ken W. Niederst, Allison Park, all of PA (US)

(73) Assignee: PPG Industries Ohio, inc., Cleveland, OH (US)

( * ) Notice: Subject to any disclaimer, the term of this patent is extended or adjusted under 35 U.S.C. 154(b) by 0 days.

(21) Appl. No.: 09/505,416

(22) Filed: Feb. 16, 2000

(51) Int. Cl.$^7$ .................... B32B 01/02; B32B 27/08; C08G 59/50; C08L 63/00
(52) U.S. Cl. .................. 428/480; 428/35.2; 428/36.9; 428/413; 428/474.4; 428/500; 428/523; 525/523; 525/524; 525/526; 528/124; 528/407
(58) Field of Search .................... 525/523, 524, 525/526; 428/413, 35.2, 36.9, 474.4, 480, 500, 523; 528/124, 407

(56) References Cited

U.S. PATENT DOCUMENTS

| | | | |
|---|---|---|---|
| 5,006,381 | * | 4/1991 | Nugent, Jr. et al. ................. 525/523 |
| 5,008,137 | * | 4/1991 | Nugent, Jr. et al. ................. 525/525 |
| 5,637,365 | * | 6/1997 | Carlblom ............................. 525/523 |
| 5,639,848 | | 6/1997 | Nugent, Jr. et al. ................. 528/123 |
| 5,840,825 | | 11/1998 | Carlblom et al. ................... 528/18.3 |
| 5,902,643 | | 5/1999 | Carlblom et al. ................... 427/341 |

FOREIGN PATENT DOCUMENTS

WO-95/26997-A * 10/1995 (WO).

OTHER PUBLICATIONS

Accelerated Amine Curing of Epoxy Resins, Gough, L.J. and Smith, I.T., 43 V.O.C.C.A, 409–18 (1960).

* cited by examiner

*Primary Examiner*—Robert E. L. Sellers
(74) *Attorney, Agent, or Firm*—Deborah M. Altman

(57) ABSTRACT

Gas barrier coating compositions are provided which include a polyamine component, a polyepoxide component and a hydroxy-substituted aromatic compound that is present in an amount sufficient to provide a gas barrier coating having an oxygen permeability less than or equal to 75 percent of the oxygen permeability of the same composition without a hydroxy-substituted aromatic compound. Also provided is a multi-layer packaging material having at least one gas permeable packaging material layer and at least one gas barrier material layer formed from the gas barrier coating composition. Sealable containers are also provided.

46 Claims, No Drawings

GAS BARRIER COATING OF POLYAMINE, POLYEPOXIDE AND HYDROXYAROMATIC COMPOUND

FIELD OF THE INVENTION

The present invention relates to gas barrier coating compositions for application to polymeric packaging materials and multi-layer packaging materials prepared therefrom.

BACKGROUND OF THE INVENTION

Plastics have become increasingly popular as replacement materials for glass and metal packaging materials. Advantages of plastic packaging materials over glass packaging materials include lighter weight, decreased breakage and decreased cost. Unlike metal packaging materials, plastic packaging materials can be used to form re-closeable containers. Notwithstanding the above, common plastic packaging materials, for example, polyesters, polyolefins and polycarbonates, tend to be gas permeable and can be problematic if employed to package oxygen-sensitive items, such as foodstuffs, chemicals or pharmaceuticals and/or carbonated beverages.

The extent to which oxygen can permeate a particular plastic packaging material is typically expressed as the oxygen permeability constant. The oxygen permeability constant (herein referred to as "$P(O_2)$") of such plastic packaging materials, which quantifies the amount of oxygen which can pass through a film or coating under specified conditions, is generally expressed in units of cubic centimeter-mil/100 inches$^2$/atmosphere/day. Specifically, this is a standard unit of permeation measured as cubic centimeters of oxygen permeating through a sample of packaging material which is 100 square inches (645 square centimeters) in area and 1 mil (25.4 microns) thick, over a 24 hour period, under a partial pressure differential of one atmosphere, at a specified temperature and relative humidity ("R.H."). As used herein, unless otherwise stated, $P(O)_2$ values are reported at 25° C. at 50–55 percent R.H.

Many foodstuffs, beverages, chemicals and pharmaceuticals are susceptible to oxidation which can cause discoloration and/or spoilage. Hence, such items must be protectively packaged to prevent exposure to oxygen. Moreover, carbonated beverages must be stored in sealed containers to prevent escape of gaseous carbon dioxide which could render the beverage unacceptably "flat". Since oxygen and carbon dioxide can readily permeate through many of the plastic packaging materials commonly used in the packaging industry, items stored in conventional plastic containers have a significantly reduced shelf life as compared to the shelf life of those items when packaged in glass or metal containers.

Some specific examples of particularly oxygen-sensitive items include perishable foodstuffs and beverages, such as tomato-based products, for example, catsup, tomato sauces and tomato pastes, fruit and vegetable juices, and malt beverages, for example, beer, ale and malt liquor. Exposure to even minute amounts of oxygen over a relatively short period of time can adversely affect the color and taste of such products. Some specific examples of carbonated beverages, the shelf life of which may be seriously reduced if packaged in conventional plastic containers, include malt beverages, soft drinks, sparkling water, sparkling wine and the like.

One of the most common plastic packaging materials used in the food and beverage industry is poly(ethylene terephthalate) (hereinafter referred to as "PET"). Notwithstanding widespread use in the industry, PET has a relatively high $P(O_2)$ value (i.e., approximately 6.0). For this reason, the food and beverage industry has sought to improve the $P(O_2)$ value of PET. It should be understood that, although $P(O_2)$ values refer to the permeability of oxygen through a film or coating, lowering the $P(O_2)$ value not only improves oxygen barrier properties, but can improve carbon dioxide barrier properties as well.

Generally, there are two methods known in the art for improving the $P(O_2)$ of a plastic packaging material. The plastic itself can be chemically and/or physically modified. This method is typically expensive and can create problems during recycling. Alternatively, the plastic packaging material can be coated with a gas barrier material, as by applying thereto a gas barrier coating composition or a gas barrier film. The latter method is commercially more attractive than the former because it is typically more cost effective and creates few, if any, recycling problems.

Numerous gas barrier coating compositions have been disclosed in the prior art. For example, polyepoxide-polyamine based gas barrier coating compositions having low $P(O_2)$ values are disclosed in commonly-owned U.S. Pat. Nos. 5,006,361; 5,008,137 5,300,541; 5,006,381; and WO 95126997. Also known in the art are polyepoxide-polyamine based gas barrier coatings having very low $P(O_2)$ values which further comprise platelet-type fillers, such as silica and mica, having a specified particle size distribution. The presence of the platelet-type fillers in the gas barrier coating compositions provides a plastic packaging material having improved barrier properties while maintaining high gloss appearance properties. The above-mentioned coating compositions generally have found commercial acceptance as gas barrier coatings for polymeric containers.

For certain applications, the gas barrier packaging material must meet stringent chemical resistance requirements. For example, fruit juices typically are pasteurized at a temperature of 180° F. to 190° F. (82° C. to 87° C.) prior to filling. The plastic containers formed from gas barrier packaging material are filled with the hot product. This process is commonly referred to as a "hot-fill" process. During the hot-fill process, the gas barrier coating (which had been applied to the plastic container to form a gas barrier packaging material) can be contacted with hot fruit juices which often are highly acidic. For these hot-fill applications, the gas barrier packaging material must not only provide gas barrier properties, but must be chemically resistant as well.

Hydroxy-substituted aromatic compounds are well-known in the art as catalysts for the curing reaction between polyamines and polyepoxides. See *Accelerated Amine Curing of Epoxy Resins*, L. H. Gough et al., Research Department, Cray Valley Products, Ltd., reprinted in 43 J.O.C.C.A. 409–18, June 1960 and references cited above. It is not known, however, to employ such compounds in gas barrier coating compositions for the enhancement of gas barrier properties. Moreover, these hydroxy-substituted aromatic compounds are not known for use in thermoplastic polyamine-polyepoxide based gas barrier coating compositions.

The chemical resistance of the aforementioned polyamine-polyepoxide based gas barrier coatings can be improved by reducing the amine:epoxy ratio in the composition. However, a reduction in the amount of polyamine in the composition, which can result in improved chemical resistance, can also result in a packaging material having reduced gas barrier properties. In view of the foregoing, clearly a need exists in the food and beverage packaging industry for a chemically resistant packaging material having improved gas barrier properties.

SUMMARY OF THE INVENTION

In accordance with the present invention, provided is a gas barrier coating composition comprising a polyamine component (A), a polyepoxide component (B), and a hydroxy-substituted aromatic compound (C). The polyamine component (A) comprises at least one polyamine and the polyepoxide component (B) comprises a polyepoxide having at least two glycidyl groups linked to an aromatic member. The hydroxy-substituted aromatic compound (C) is represented by the following structure (I):

wherein A is arylene; $R^1$ and $R^2$ are each independently H, OH, $R^3$, $O(OC)R^{'3}$, $NH(CO)R^{'3}$, $NH_2$, $CH_2R^4$, $C(CH_3)_2R^4$ or $(CO)R^5$, where $R^3$ is alkyl; $R^{'3}$ is H or alkyl, $R^4$ is a hydroxy-substituted aromatic group or an amino group; and $R^5$ is a (di)hydroxy-substituted aromatic group, provided that when $R^1$ is H or $R^3$, $R^2$ cannot be H or $R^3$. The hydroxy-substituted aromatic compound (C) is present in the gas barrier coating composition in an effective amount which is sufficient to provide a gas barrier coating having an oxygen permeability ($P(O_2)$) less than or equal to 75 percent of the $P(O_2)$ of a gas barrier coating provided by the same gas barrier coating composition which does not comprise the hydroxy-substituted aromatic compound (C).

A multi-layer packaging material having at least one gas permeable packaging material layer and at least one gas barrier material layer is also provided. The gas barrier material layer comprises the composition described immediately above. The hydroxy-substituted aromatic compound (C) described above is present in the gas barrier material layer in an amount which is sufficient to provide a gas barrier material layer having a $P(O_2)$ less than or equal to 75 percent of the $P(O_2)$ of a multi-layer packaging material comprising the same gas permeable packaging material layer and the same gas barrier material layer, which does not comprise a hydroxy-substituted aromatic compound. Containers formed from the multi-layer gas barrier material are also provided.

Other than in the operating examples, or where otherwise indicated, all numbers expressing quantities of ingredients, reaction conditions, and so forth used in the specification and claims are to be understood as being modified in all instances by the term "about." Also, as used herein, the term "polymer" is meant to refer to oligomers and both homopolymers and copolymers.

DETAILED DESCRIPTION OF THE INVENTION

As mentioned above, the improved gas barrier coating composition of the present invention comprises a polyamine component (A) which comprises at least one polyamine, a polyepoxide component (B) which comprises a polyepoxide having at least two glycidyl groups linked to an aromatic member, and a hydroxy-substituted aromatic compound (C) which is represented by the structure (I) above where the substituents A, $R^1$, $R^2$, $R^3$ and $R^4$ are as described above for that structure. Preferably, A represents a phenylene or naphthylene group, $R^1$ represents H, and $R^2$ represents OH or $O(OC)R^{'3}$ where $R^{'3}$ is H (i.e., acetoxy).

The gas barrier coating compositions of the present invention can be thermosetting compositions or, alternatively, thermoplastic compositions.

When, as is preferred, the gas barrier coating composition of the present invention is a thermosetting composition, the polyamine component (A) and the polyepoxide component (B) are admixed with the hydroxy-substituted aromatic compounds (C) as separate components of the composition. When the gas barrier coating composition is a thermoplastic composition, the polyamine component (A) and the polyepoxide component (B) are pre-reacted to form a thermoplastic amine-epoxy resin prior to mixing with the hydroxy-substituted aromatic compound (C) to form the gas barrier coating composition.

As mentioned above, hydroxy-substituted aromatic compounds are generally well-known in the art as catalysts in thermosetting compositions for the curing reaction between polyamines and polyepoxides. Surprisingly, however, it has been found that members of the class of hydroxy-substituted aromatic compound represented by the structure (I) above, when included as component (C) in the thermosetting gas barrier coating compositions of the present invention, not only serve as catalysts for the polyamine-polyepoxide reaction, but also provide enhanced gas barrier properties. Further, when included as component (C) in the thermoplastic gas barrier coating compositions of the present invention, these hydroxy-substituted aromatic compounds have been found to enhance gas barrier properties.

The hydroxy-substituted aromatic compound (C) is present in the gas barrier coating composition of the present invention in an effective amount sufficient to provide an oxygen permeability ($P(O_2)$) less than or equal to 75 percent, preferably less than or equal to 60 percent, and more preferably less than or equal to 50 percent of the $P(O_2)$ of the same gas barrier coating composition which does not contain a hydroxy-substituted aromatic compound.

In a preferred embodiment of the invention, the hydroxy-substituted aromatic compound (C) is selected from the group consisting of 2-acetamidophenol, 3-acetamidophenol, 3-aminophenol, Bisphenol A, Bisphenol F, resorcinol, resorcinol monoacetate, methyl hydroquinone, hydroquinone, catechol, phloroglucinol and a Mannich base compound which is the reaction product of resorcinol, a carbonyl-containing compound and an amine. Resorcinol and resorcinol monoacetate are preferred.

The hydroxy-substituted aromatic compound (C) is typically present in the gas barrier coating compositions of the present invention in an amount ranging from at least 0.01 percent by weight, preferably at least 0.05 percent by weight, more preferably at least 0.1 percent by weight, and even more preferably at least 0.5 percent by weight based on the total weight of resin solids in the film-forming composition. The hydroxy-substituted aromatic compound (C) also typically is present in the compositions of the present invention in an amount less than 15 percent by weight, preferably less than 12 percent by weight, more preferably less than 10 percent by weight, and even more preferably less than 8 percent by weight based on the total weight of resin solids in the gas barrier coating compositions. The amount of the hydroxy-substituted aromatic compound (C) present in the gas barrier coating compositions of the invention can range between any combination of these values inclusive of the recited values.

As aforementioned, the gas barrier coating compositions of the present invention also comprises a polyamine component (A) and a polyepoxide component (B). The polyamine component (A) comprises at least one polyamine, suitable examples of which include m-xylylenediamine ("MXDA") such as Gaskamine 328, and Gaskamine 328S available from Mitsubishi Gas Chemical. Co., Inc. The polyamine also can comprise a pre-reacted, ungelled amine group-containing adduct having active amine hydrogens.

By "ungelled" is meant that the amine group-containing adducts are substantially free of crosslinking and have an intrinsic viscosity when dissolved in a suitable solvent, as determined, for example, in accordance with ASTM-D1795 or ASTM-D4243. The intrinsic viscosity of the adduct is an indication of its molecular weight. A gelled reaction product, on the other hand, since it is of essentially infinitely high molecular weight, will have an intrinsic viscosity too high to measure.

In a preferred embodiment of the present invention, the polyamine is represented by the structure (II):

(II)

where $\Phi$ represents an aromatic group-containing compound, $R^6$ represents a $C_1$ to $C_4$ alkyl group, and k represents a value greater than or equal to 1.5.

Preferably, k is 1.7 or greater, more preferably 1.9 or greater, and even more preferably, 2.0 or greater. Preferably, $R^6$ is not larger than $C_3$, more preferably not larger than $C_2$, and even more preferably not larger than $C_1$. Typically, $\Phi$ comprises an aryl group, preferably a phenyl and/or a naphthyl group.

The gas barrier coating compositions of the present invention can be produced without pre-forming an ungelled polyamine adduct. In instances where a polyamine adduct is not formed, all of the epoxide (that is, the polyepoxide component (B) described below) is blended or reacted with the polyamine (that is, the polyamine component (A)).

When the polyamine component (A) is in the form of a pre-reacted ungelled amine group-containing adduct having active amine hydrogens, sufficient active amine hydrogen groups must be left unreacted so as to provide reaction sites for reacting with the polyepoxide component (B). In other words, when the gas barrier coating composition is a thermosetting composition, there must be sufficient active amine hydrogens remaining to react with the polyepoxide component (B) during the final curing step. Alternatively, when the gas barrier coating composition is a thermoplastic composition, there must be sufficient active amine hydrogens remaining to react with the polyepoxide component (B) to form a thermoplastic amine-epoxide resin. Typically, 10 to 80 percent of the active amine hydrogens of the polyamine are reacted with epoxy groups. Pre-reacting fewer of the active amine hydrogens reduces the effectiveness of the pre-reaction step and provides little of the linearity in the polymer product, which is one of the advantages of forming the adduct.

In accordance with one embodiment of the present invention, the ungelled amine group-containing adduct can be formed by reacting (a) a polyamine, such as those described above, with (b) epichlorohydrin. By carrying out the reaction at polyamine to epichlorohydrin molar ratios greater than 1:1 in the presence of an alkali, a primary reaction product is polyamine groups joined by 2-hydroxypropylene linkages. The reaction of m-xylylenediamine, a preferred polyamine, with epichlorohydrin is described in U.S. Pat. No. 4,605,765. Such products are commercially available as GASKAMINE 328® and GASKAMINE® 328S from Mitsubishi Gas Chemical Company.

In an alternative embodiment, the ungelled amine group-containing adduct is formed by reacting the polyamine (a) with a polyepoxide having a plurality of glycidyl groups linked to an aromatic member (c). As used herein, the term "linked" refers to the presence of an intermediate linking group.

Such polyepoxides can be represented by the following structure (III):

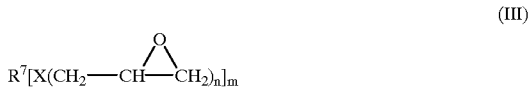
(III)

where $R^7$ is phenylene or naphthylene; X is N, $NR^8$, $CH_2N$, $CH_2NR^8$, O, and/or C(O)—O, where $R^8$ is an alkyl group containing 1 to 4 carbon atoms, a cyanoethyl group or cyanopropyl group; n is 1 or 2; and m is 2 to 4.

Non-limiting examples of suitable polyepoxides include N,N,N',N'-tetrakis (oxiranylmethyl)-1,3-benzene dimethanamine (for example, the polyepoxide commercially available as TETRAD X from Mitsubishi Gas Chemical Co.), resorcinol diglycidyl ether (for example, HELOXY® 69 commercially available from Shell Chemical Co.), diglycidyl esters of phthalic acid (for example, EPI-REZ® A-100 epoxy resin commercially available from Shell Chemical Co.), diglycidyl esters of isophthalic acid, diglycidyl esters of terephthalic acid, and triglycidyl para-aminophenol (for example, Epoxy Resin 0500 commercially available from Ciba-Geigy Corporation).

The reaction of the epoxide and the polyamine (a) to produce the ungelled adduct is carried out at temperatures and concentrations of reactants sufficient to produce the desired ungelled product. These temperatures and concentrations will vary depending upon the selection of starting materials. Typically, however, reaction temperatures will range from 40° C. to 140° C., with lower temperatures (e.g., from 40° C. to 110° C.) being preferred for those systems that are more susceptible to gelation. Similarly, concentrations of reactants will typically range from 5 to 100 percent by weight of reactant in an appropriate solvent depending upon the particular molar ratio and type of reactants. Lower concentrations of reactants are generally preferred for those systems that are more susceptible to gelation.

Specific reaction conditions can readily be chosen by one skilled in the art guided by the disclosure and the examples herein. Moreover, preparation of an ungelled amine-functional polymeric adduct is also described in commonly-owned U.S. Pat. No. 5,006,381, columns 2 through 7.

In most instances, forming the amine group-containing adduct has the advantage of increasing molecular weight while maintaining linearity of the resin, thereby avoiding gelation. This can be achieved by using a polyamine which has no more than two primary amino groups.

Typically, the polyamine (a) (when used as the sole polyamine component (A)) reacts relatively slowly with the polyepoxide component (B). Conversely, the aforementioned amine group-containing adduct (when used as the sole polyamine component (A)) reacts relatively quickly with the polyepoxide component (B). Accordingly, use of the amine group-containing adduct provides the advantage of reduced reaction times.

The polyepoxide component (B) may be any epoxide known to those of skill in the art which is reactive with the polyamine component (A) to form the gas barrier coating compositions of the present invention. Preferably, the polyepoxide component (B) includes polyepoxides having a plurality of glycidyl groups which are linked to an aromatic member such as those represented by the structure (III) described above. Specific examples of polyepoxides suitable for use as component (B) include those described above which can be reacted with the polyamine (a) to form the ungelled amine group-containing adduct.

It should be understood that the polyepoxides which are employed in the formation of the amine group-containing adduct may be the same or different as those used as the polyepoxide component (B). Typically, if an amine group-containing adduct is used in the gas barrier coating compositions of the invention, the epoxides used to form the amine group-containing adduct and those used as the polyepoxide component (B) have epoxy functionality of at least 1.4, and preferably at least 2.0. A small amount of monoepoxide can also be used.

The polyepoxide component (B) can include polyepoxides that are saturated or unsaturated, aliphatic, cycloaliphatic, aromatic, or heterocyclic, and may be substituted with non-interfering substituents such as hydroxyl groups or the like. Generally, such polyepoxides can include polyglycidyl ethers of aromatic polyols, which can be formed by etherification of aromatic polyols with epichlorohydrin or dichlorohydrin in the presence of an alkali. Specific examples of such include bis(2-hydroxynaphthyl) methane, 4,4'-dihydroxylbenzo-phenone, 1,5-dihydroxynaphthylene and the like. Also suitable for use as the polyepoxide component (B) are polyglycidyl ethers of polyhydric aliphatic alcohols including cyclic and polycyclic alcohols.

Generally, the polyepoxide component (B) has a molecular weight above 80. Preferably, the molecular weight of the polyepoxide component (B) ranges from 100 to 1,000, and more preferably from 200 to 800. Moreover, the polyepoxide component (B) generally has an epoxy equivalent weight above 40. Preferably, the equivalent weight of the polyepoxide component (B) ranges from 60 to 400 and more preferably from 80 to 300.

It should be noted that each amine hydrogen of the polyamine component (A) theoretically is able to react with one epoxy group, and as such is considered as one amine equivalent. Thus, for purposes of the present invention, a primary amine nitrogen is considered to be difunctional with respect to epoxide groups.

In the thermosetting gas barrier coating compositions of the present invention, the polyamine component (A) and the polyepoxide component (B) typically are present in amounts sufficient to provide a ratio of equivalents of active amine hydrogen in (A) to equivalents of epoxy groups in (B) of 2.0:1.0 or less, and preferably 1.75:1.0 or less.

When the gas barrier coating compositions of the invention are thermoplastic compositions, the polyamine component (A) and the polyepoxide component (B) are typically present in amounts sufficient to provide molar ratio of polyamine to polyepoxide in the reaction mixture ranging from 1.4:1 to 0.83:1, preferably from 1.25:1 to 1.05:1, and more preferably from 1.2:1 to 1.1:1. In a preferred embodiment, the thermoplastic gas barrier composition involves the reaction of polyamine having two primary amino nitrogen equivalents per mole (one equivalent per primary amino nitrogen group) with a polyepoxide having an average of two epoxy equivalents per mole (e.g., the reaction between a diamine and a diepoxide).

Preferably, the reaction product of the polyamine component (A) and the polyepoxide component (B) contains a substantial number of unreacted amine hydrogens. However, although maximizing the amount of polyamine will typically maximize gas barrier properties of the resultant gas barrier coating, the concomitant reduction in the amount of polyepoxide present may adversely affect general film properties of the formed thermoplastic coatings and crosslink density of cured or thermoset coatings. Conversely, in a thermosetting coating, the use of more polyepoxide than the preferred amounts can result in a brittle film.

As discussed above, the chemical resistance of a polyamine-polyepoxide gas barrier coating can be improved by a reduction in the amount of amine present in the gas barrier coating composition. However, attaining improved chemical resistance in this way, has a concomitant reduction in gas barrier properties. The gas barrier coating compositions of the present invention overcome this reduction in gas barrier properties with the inclusion in the composition of the hydroxy-substituted aromatic compound (C) as discussed above.

The gas barrier coating composition of the present invention can be applied over a gas permeable substrate as either a solvent-based or an aqueous-based coating composition. If solvents are used, they should be chosen so as to be compatible with the substrate being coated, and also provide desirable flow properties to the liquid composition during application. Suitable solvents include oxygenated solvents, such as glycol ethers (e.g., 2-methoxyethanol, 2-ethoxyethanol, 2-propoxyethanol, 2-butoxyethanol, 1-methoxy-2-propanol and the like), or alcohols such as methanol, ethanol, propanol and the like. Glycol ethers, such as 2-butoxyethanol and 1-methoxy-2-propanol, are more preferred with 1-methoxy-2-propanol being most preferred. The use of 1-methoxy-2-propanol is preferred for its rapid evaporation rate which minimizes solvent retention in the dried or cured film. In order to obtain desired flow characteristics in some of the embodiments using a pre-reacted adduct, use of 2-butoxyethanol may be preferred. Moreover, in embodiments not requiring slow evaporating solvents for the sake of flow properties, the solvents listed here may be diluted with less costly solvents such as toluene or xylene. The solvent can also include a halogenated hydrocarbon. For example, a chlorinated hydrocarbon, such as methylene chloride, 1,1,1-trichloroethane and the like (usually considered fast evaporating solvents), may be especially useful in obtaining barrier films. Mixtures of such solvents may also be employed. Non-halogenated solvents are preferred where the resultant barrier material is desired to be halide-free.

The polyamine component (A) can also be in the form of an aqueous solution or dispersion. For example, when the polyepoxide component (B) is water-soluble (e.g., the polyglycidyl ether of an aliphatic diol), the polyamine component (A) can be utilized as an aqueous solution-Otherwise, with water-insoluble polyepoxides, the polyamine component (A) can have sufficient amine groups neutralized with an organic acid (e.g., formic acid, lactic acid or acetic acid), or with an inorganic acid (e.g., hydrochloric acid or phosphoric acid), to facilitate dispersion in an aqueous medium. For such aqueous-based systems, an organic acid is typically preferred.

The gas barrier coating compositions of the present invention which comprise an ungelled amine group-containing adduct typically have a resin solids content ranging from 15 to 50 weight percent, and preferably from 25 to 40 weight percent based on weight of total resin solids in the composition. Higher weight percentages may present application difficulties, particularly with spray application, while lower weight percentages will typically require removal of greater amounts of solvent during the curing stage. For the embodiments using direct reaction of the polyamine (such as the sole polyamine component (A)) and the polyepoxide component (B), solids contents above 50 weight percent can be applied successfully.

The gas barrier coating composition of the present invention can further include additives known to those skilled in the art. Some of the more common additives, which can be present, include inorganic filler particles, pigments, silicones, surfactants and catalysts different from the hydroxy-substituted aromatic compound (C). Each of these specific optional components will be discussed below.

With regard to the use of inorganic fillers and pigments, in addition to imparting color and/or tint to the gas barrier material, their use can also even further enhance gas barrier properties of the resultant coating. If employed, the weight ratio of pigment to binder is typically not more than 1:1, preferably not more than 0.3:1, and more preferably not more than 0.1:1. The binder weight used in these ratios is the total solids weight of the polyamine-polyepoxide resin in the gas barrier coating composition.

An especially preferred class of inorganic fillers include platelet-shaped fillers having a particle size distribution characterized by a number mean particle diameter ranging from 5.5 to 15 microns and a volume mean particle diameter ranging from 8 to 25 microns. Examples of suitable platelet-shaped fillers include mica, vermiculite, clay, talc, micaceous iron oxide, silica, flaked metals, flaked graphite, flaked glass and the like. Such platelet-shaped fillers are described in detail in U.S. Pat. No. 5,840,825 at column 10, line 1 to column 11, line 24.

Silicones may be included in the gas barrier coating compositions of the present invention to assist in wetting the substrate over which the barrier material is applied. Generally, silicones useful for this purpose include various organosiloxanes such as polydimethylsiloxane, polymethylphenylsiloxane and the like. Specific examples of such include SF-1023 silicone (a polymethylphenylsiloxane available from General Electric Co.), AF-70 silicone (a polydimethylsiloxane available from General Electric Co.), and DF-100 S silicone (a polydimethylsiloxane available from BASF Corp.). If employed, such silicones are typically added to the gas barrier coating composition in amounts ranging from 0.01 to 1.0 percent by weight based on total resin solids in the gas barrier coating composition.

Surfactants are typically included in the aqueous-based versions of the gas barrier coating compositions. Examples of surfactants that can be used for this purpose include any suitable nonionic or anionic surfactant known in the art. If employed, such surfactants are typically present in an amount ranging from 0.01 to 1.0 percent by weight based on the total weight of the gas barrier coating composition.

As aforementioned, catalysts different from the hydroxy-substituted aromatic compound (C) can be included in the gas barrier coating composition of the invention to aid in the reaction between the polyamine component (A) and the polyepoxide component (B). Generally, any suitable catalyst that is used for epoxy-amine reactants can be employed for this purpose. Examples of such suitable catalysts include triphenyl phosphite, calcium nitrate and the like.

In the case where the gas barrier coating composition is a thermosetting composition, prior to application to a substrate, the polyamine component (A), the polyepoxide component (B) and the hydroxy-substituted aromatic compound (C)) are first thoroughly mixed together. In the case where the gas barrier coating composition is a thermoplastic composition, the polyamine component (A) and the polyepoxide component (B) are pre-reacted to form a thermoplastic resin which is subsequently mixed with the hydroxy-substituted aromatic compound (C). After mixing, the gas barrier coating composition can be immediately applied to the substrate, or held for a period of time typically ranging from 1 to 60 minutes prior to application to improve cure (in the case of a thermosetting composition) and/or clarity. This holding time can be reduced and/or eliminated when the polyamine component (A) comprises the amine group-containing adduct or when the solvent employed is 2-butoxyethanol.

The gas barrier coating composition can be applied by any conventional means known to those skilled in the art (e.g., spraying, rolling, dipping, brushing and the like). Preferred methods of application include spray and/or dipping processes.

After application to the substrate, thermosetting gas barrier coating compositions of the invention may be cured at temperatures as low as ambient temperature by allowing for a gradual cure over several hours to several days. However, such low temperature curing is generally slower than desired for commercial production lines. It is also not an efficient means of removing solvent from the cured barrier material. Therefore, in one preferred embodiment, the oxygen barrier material is cured by heating it at elevated temperatures as high as possible without distorting the substrate over which it is applied.

For a relatively "slow" solvent (ie., a solvent having a relatively low evaporation rate), curing temperatures typically can range from 55° C. to 110° C., and preferably from 70° C. to 95° C. At such curing temperatures, curing times will typically range from 1 to 60 minutes. For a relatively "fast" solvent (i.e., a solvent having relatively high evaporation rate), curing temperatures typically range from 35° C. to 70° C., and preferably from 45° C. to 65° C. At such curing temperatures, curing times will typically range from 0.5 to 30 minutes.

Once applied to the substrate, thermoplastic gas barrier coating compositions of the invention typically are dried to remove solvent by heating from sufficient time at temperatures sufficient to leave a film of the thermoplastic coating. Generally drying temperatures will be sufficiently low to prevent distortion of the substrate. Typical drying temperatures range from 160° F. (71.1° C.) to 230° F. (110° C.) for 1 to 60 minutes. Optionally, films can be dried at lower temperatures, for example, as low as 70° F. (21.1° C.) by allowing for drying over a period of several days.

The gas barrier coatings of the present invention can have any suitable dry film thickness. Although thicker coatings typically provide increased gas barrier properties, the packaging industry typically prefers thinner coating for economic reasons. As such, the gas barrier coatings of this invention generally have a dry film thickness of not more than 1.0 mil (25.4 microns). If even thinner films are desired, the gas barrier coating of the present invention can have a dry film thickness of not more than 0.5 mil (12.7 microns), and even of not more than 0.3 mil (7.6 microns).

The gas barrier coating compositions of the present invention typically form gas barrier coatings having a $P(O_2)$ of no greater than 0.5, preferably no greater than 0.35, and more preferably no greater than 0.25 cubic centimeters-mil/square inches/atmosphere/day.

The gas barrier coatings of the invention are also relatively smooth, transparent and glossy. Preferably, the gas barrier coatings prepared in accordance with this invention have a 20° gloss of at least 60, preferably at least 70, and more preferably at least 80 as measured using a Gardner Glossgard IIa 20° glossmeter from Gardner Instruments.

The gas barrier coating composition can be applied over a substrate as a single layer or as multiple layers with multiple heating stages to remove solvent from each subsequent layer. Both are referred to herein as "multi-layer" packaging materials.

The present invention also provides a multi-layer packaging material which has improved gas barrier properties. The multi-layer packaging material of the present invention includes at least one layer of a gas permeable substrate material and at least one layer of a gas barrier material which comprises the polyamine component (A), the polyepoxide component (B) and the hydroxy-substituted aromatic compound (C) as described above. The hydroxy-substituted aromatic compound (C) is present in the gas barrier material layer in an effective amount sufficient to provide a gas barrier material layer having a $P(O_2)$ less than or equal to 75 percent, preferably less than or equal to 60 percent, and more preferably less than or equal to 50 percent of the $P(O_2)$ of a multi-layer packaging material comprising the same gas permeable substrate material layer and the same gas barrier material layer which does not contain a hydroxy-substituted aromatic compound.

To form the multi-layer packaging material of the invention, the gas barrier coating composition as described above can be applied over any suitable substrate. Typically, however, it is applied over a gas permeable substrate, and preferably, it is applied over a polymeric, gas permeable packaging material.

Gas permeable materials over which the gas barrier coating composition can be applied typically include any polymeric material through which gases can readily pass and which can be used as a suitable packaging material. Examples of such suitable gas permeable materials which can be used in the packaging of food, beverages, chemicals, medicines, medical supplies, and the like include polyesters, polyolefins, polyamides, cellulosics, polystyrenes, and polyacrylics. Due to their physical properties, polyesters are preferred. Examples of polyesters suitable for this purpose include PET, poly(ethylene napthalate) ("PEN"), and/or combinations thereof.

In one embodiment of the present invention, the multi-layer packaging material comprises a laminate which includes a layer of the gas barrier material. To form such a laminate, the gas barrier material is applied onto a first layer of a suitable substrate material and, thereafter, a second layer of a similar or dissimilar substrate material is applied over the layer of the gas barrier material.

In embodiments of the present invention where a polyolefin (e.g. polypropylene) is used as the gas permeable packaging material, the surface of the polyolefin preferably is treated to increase surface tension and promote better adhesion of the oxygen barrier material to the polyolefin material. Examples of treatment techniques which can be used for this purpose include flame-treating, corona-treating and the like. Specific examples of such treatment techniques are described in detail by Pinner et al. in *Plastics: Surface and Finish*, Butterworth & Co. Ltd. (1971), Chapter 3.

In another embodiment of a multi-layer packaging material encompassed by the present invention, a sheet or film stock, which is subsequently formed into containers by conventional plastic processing techniques, is coated with the gas barrier coating composition described above. Thereafter, the coated film or sheet is formed into articles such as wrappers, bags, containers and the like.

In still another embodiment of a multi-layer packaging material encompassed .by the present invention, pre-formed containers (e.g., beverage bottles), are coated with at least one layer of the gas barrier coating composition described above.

For some applications, it may be desirable to treat the multi-layer packaging material of the invention with $CO_2$. The gas barrier coating composition is applied over a packaging material and thereafter the coating is exposed to a $CO_2$ atmosphere at an elevated pressure and temperature. During such a treatment process, $CO_2$ pressures typically range from 30 to 1,000 pounds per square inch (2 bar to 70 bar); treatment temperatures typically range from 32° F. (0° C.) to 200° F. (93° C.); and treatment duration can range from 1 minute to 6 weeks. Preferably, during the treatment process, $CO_2$ pressures range from 30 to 100 pounds per square inch (2 bar to 7 bar); treatment temperatures range from 40° F. (14° C.) to 150° F. (65° C.); and treatment duration ranges from 1 hour to 3 weeks.

Alternatively, the gas barrier coating is applied over a gas permeable packaging material which is in the form of a sealable container. Thereafter, the container is at least partially filled with a carbonated beverage and sealed. Since the packaging material is gas permeable, $CO_2$ can pass there through. As such, the carbonated beverage is being used as the $CO_2$ treating medium. For this $CO_2$ treatment method, the gas permeable material should have a $P(O_2)$ value greater than 0.5.

The multi-layer packaging materials of the present invention are ideally suited for packaging of food, beverages, chemicals, medicines, medical supplies, and the like. Illustrating the invention are the following examples which, however, are not to be considered as limiting the invention to their details. Unless otherwise indicated, all parts and percentages in the following examples, as well as throughout the specification, are by weight.

EXAMPLES

Example 1 describes the preparation of an ungelled Mannich base adduct which can be advantageously employed as the hydroxy-substituted aromatic compound (C) in the gas barrier coating compositions of the present invention.

Examples A to V describe the preparation of thermosetting gas barrier coating compositions. Examples A to N were cured at 180° F. (82.5° C.) and Examples O to V were cured at 145° F. (62.8° C.). Comparative Examples A and O contain no hydroxy-substituted compound.

Example 2 describes the preparation of a thermoplastic, ungelled amine-epoxy adduct which was subsequently used in the thermoplastic gas barrier coating compositions as the preformed reaction product of the polyamine component (A) and the polyepoxide component (B). Example 2A describes a comparative thermoplastic gas barrier coating composition which contains only the adduct of Example 2 with no hydroxy-substituted aromatic compound. Example 2 describes the preparation of a thermoplastic gas barrier coating composition of the present invention which contains 5 percent by weight of resorcinol as the hydroxy-substituted aromatic compound (C).

Example 1

This example describes the preparation of an ungelled Mannich base adduct useful as the hydroxy-substituted aromatic compound (C) in the gas barrier coating composition of the present invention.

To a suitably equipped reaction vessel was charged 1 mole (110 grams) of resorcinol, 1 mole (136 grams) of m-xylylenediamine and 533 grams of 1-methyl-2-pyrolidinone. The reaction mixture was heated to a temperature of 30° C. in a nitrogen atmosphere, and 1 mole (30 grams) of formaldehyde (that is. 81.1 grams of a 37% aqueous solution) was added over a period of 1 hour. The reaction mixtures was held at a temperature of 40° C. for a period of 1 hour, then the temperature was increased to 50° C. and held for an additional 1 hour period. The resultant adduct had a theoretical molecular weight of 258, a theoretical solids content of 30 weight percent, and a theoretical amine hydrogen equivalent weight of 86.

Examples A to W

Preparation of Thermosetting Gas Barrier Coating Compositions

Gas barrier coating compositions of Examples A to V were prepared by mixing under mild agitation 17.2 percent by weight of GASKAMINE® 328S (reaction product of m-xylylenediamine and epichlorohydrin commercially available from Mitsubishi Gas Chemical Co., 70% solution in 1-methoxy-2-propanol (commercially available from Dow Chemical Co. as DOWANOL® PM)); 25.7 percent by weight TETRAD-X® (polyglycidyl m-xylylenediamine commercially available from Mitsubishi Gas Chemical Co., 65% solution in ethyl acetate); 57.0 weight percent of 1-methoxy-2-propanol; and 0.1 weight percent of SF1023 (siloxane surfactant commercially available from General Electric Co.).

To each of the gas barrier compositions of Examples B to O and P to V was added the indicated amount of each of the additives (as component (C)) listed in the following Table I. The compositions of Comparative Examples A and P contained no additive. The gas barrier coating compositions of Examples A to V had a final solids content of approximately 25 percent by weight based on total solids of the composition, and an NH to epoxy ratio of 1.0.

Each of the gas barrier compositions prepared as described above were applied to a 2 mil (50.8 micrometers) PET film test panel using a 026 wire wound drawdown bar. The test panels coated with the compositions of Examples A to O were cured at a temperature of 180° F. (82.5° C.) and those coated with the compositions of Examples P to V were cured at a temperature of 145° F. (62.8° C.) for a period of time necessary to achieve a tack-free state as determined by touch. The coated test panels were subsequently cured for an additional period of time equal to the time required to achieve the tack-free state. Final gas barrier coating film thickness for each of the cured gas barrier coating compositions was approximately 0.5 mil (12.7 micrometers). The coated test panels were allowed to "age" at ambient conditions for 4 days prior to permeability testing.

Gas Permeability Testing:

Each of the PET test panels prepared as described above were tested for oxygen permeability at 25° C. at 50–55% R.H. using an OXTRAN 2/20. Oxygen permeability constants (P(O₂)) for the gas barrier material layer for each of the coated PET samples were calculated using the following equation:

$$\frac{1}{R_a} = \frac{1}{R_b} + \frac{DFT}{P(O_2)}$$

where $R_a$ represents the coated film transmission rate (cubic centimeters/100 inches²/atmosphere/day); $R_b$ represents the film transmission rate for PET; DFT represents the dry film thickness of the coating (mil); and P(O₂) represents the oxygen permeability constant of the coating (cubic centimeters-mil/100 inches²/atmosphere/day). Test results are reported in the following Tables I and II.

TABLE I

| EXAMPLE | ADDITIVE (% by weight) | P(O₂)** | TACK-FREE TIME (Minutes @ 180° F.) |
|---|---|---|---|
| A* | None | 0.21 | 15 |
| B* | 2% salicylic acid | 0.17 | 9 |
| C* | 2% water | 0.16 | 18 |
| D* | 2% p-toluenesulfonic acid | 0.19 | 12 |
| E* | 2% phenol | 0.19 | 10 |
| F* | 10% resorcinol diglycidyl ether | 0.22 | 13 |
| G | 2% resorcinol | 0.09 | 10 |
| H | 2% methyl hydroquinone | 0.07 | 13 |
| I | 4% resorcinol | 0.07 | 8 |
| J | 2% hydroquinone | 0.04 | 7 |
| K | 2% catechol | 0.10 | 6 |
| L | 2% phloroglucinol | 0.13 | 7 |
| M | 2% Bisphenol A | 0.11 | 10 |
| N | 2% Bisphenol F | 0.13 | 10 |
| O | 7.5% Adduct of Example 1 | 0.07 | 5 |

*Comparative example.
**cc-mil/100 in.²/atm./day at 50–55% R.H. and 25° C.

TABLE II

| EXAMPLE | ADDITIVE (% by weight) | P(O₂)** | TACK-FREE TIME (Minutes @ 145° F.) |
|---|---|---|---|
| P* | None | 0.24 | 35 |
| Q* | 2% phenyl salicylate | 0.23 | 25 |
| R* | 2% resorcinol monobenzoate | 0.24 | 25 |
| S | 2% 2-acetamidophenol | 0.03 | 19 |
| T | 2% 3-acetamidophenol | 0.12 | 25 |
| U | 2% resorcinol monoacetate | 0.12 | 25 |
| V | 2% 3-aminophenol | 0.13 | 25 |

*Comparative example.
**cc-mil/100 in.²/atm./day at 50–55% R.H. and 25° C.

The data reported in Tables I and II above illustrate that the thermosetting gas barrier coating compositions of the present invention (which contain the hydroxy-substituted aromatic compounds of specified structure(I)) provide cured gas barrier coatings having gas permeability values less than or equal to 75 percent of the gas permeability of barrier coatings provided by the same compositions which are free of hydroxy-substituted aromatic compounds of the specified structure (I).

Preparation of Thermoplastic Gas Barrier Coating Compositions

Example 2

This example describes the preparation of an ungelled thermoplastic amine-epoxy resin wherein the polyamine component (A) and the polyepoxide component (B) are pre-reacted to form an ungelled thermoplastic amine-epoxy adduct.

To a suitably equipped reaction vessel was charged 1 mole (136 grams) of m-xylylenediamine and 835.4 grams of 1-methoxy-2-propanol. The admixture was heated to a temperature of 100° C. under a nitrogen atmosphere. A mixture of 0.857 mole (198.4 grams) of ERISYS RDGE/H (resorcinol diglycidyl ether commercially available from CVC Specialty Chemicals, Inc. of Maple Shade, N.J.) and 1218.7 grams of 1-methoxy-2-propanol were added over a period of 2 hours. The reaction mixture was then held at 100° C. for a period of 2 hours, then cooled to a temperature of 70° C. and vacuum stripped. The resultant amine-epoxy resin had a theoretical molecular weight of 2341, a measured solids content (1 hour @ 110° C.) of 36.7 weight percent, and a theoretical amine hydrogen equivalent weight of 146.

Examples 2A and 2B

Examples 2A and 2B describe the preparation of two thermoplastic gas barrier coating compositions. Comparative Example 2A describes the preparation of a thermoplastic gas barrier coating composition which contains no hydroxy-substituted aromatic compound; and Example 2B describes the preparation of a thermoplastic gas barrier coating composition of the present invention which contains 5 percent by weight of resorcinol.

Comparative Example 2A

Comparative Example 2A consisted of the ungelled thermoplastic amine-epoxy adduct of Example 2, which contained no hydroxy-substituted aromatic compound.

Example 2B

Example 2B was prepared by adding 5 percent by weight of resorcinol to the thermoplastic amine-epoxy adduct of Example 2 and reducing the solids content of the resultant thermoplastic gas barrier coating composition to 25 weight percent using 1-methoxy-2-propanol.

Each of the compositions of Comparative Example 2A and Example 2B were applied to 2 mil PET test substrates by drawdown using a 020 wire wound bar. The coated test substrates were dried in a convection oven for 20 minutes at 145° F. (62.8° C.). Oxygen permeability was tested immediately thereafter, i.e., with no aging period, using the OXTRAN 2/20 as described above. Gas permeability data is reported in the following Table III.

TABLE III

| EXAMPLE # | $P(O_2)$ |
|---|---|
| COMPARATIVE EXAMPLE 2A | 0.59 |
| EXAMPLE 2B | 0.31 |

The permeability data presented in Table III above illustrate that the inclusion of resorcinol as the hydroxy-substituted aromatic compound (C) in a thermoplastic gas barrier coating composition provides a marked improvement in gas barrier properties over the same composition which is free of such hydroxy-substituted aromatic compounds.

Therefore we claim:

1. A gas barrier coating composition comprising:
    (A) a polyamine component comprising at least one polyamine;
    (B) a polyepoxide component comprising a polyepoxide having at least two glycidyl groups linked to an aromatic member; and
    (C) a hydroxy-substituted aromatic compound represented by the following structure (I):

    $$HO-A-R^1R^2 \quad (I)$$

wherein A is arylene; $R^1$ and $R^2$ are each independently H, OH, $R^3$, $O(OC)R^{i3}$, $NH(CO)R^{i3}$, $NH_2$, $CH_2R^4$, $C(CH_3)_2R^4$ or $(CO)R^5$, where $R^3$ is alkyl; $R^{i3}$ is H or alkyl; $R^4$ is a hydroxy-substituted aromatic group or an amino group; and $R^5$ is a (di)hydroxy substituted aromatic group, provided that when $R^1$ is H or $R^3$, $R^2$ is not H or $R^3$, and wherein the hydroxy-substituted aromatic compound (C) is present in the gas barrier coating composition in an effective amount sufficient to provide a gas barrier coating having an oxygen permeability ($P(O_2)$) less than or equal to 75 percent of the oxygen permeability ($P(O_2)$) of a gas barrier coating provided by the same gas barrier coating composition which is free of hydroxy-substituted aromatic compounds.

2. The gas barrier coating composition of claim 1, wherein the polyamine is represented by the following structure (II):

$$\Phi-(R^6NH_2)_k \quad (II)$$

where $\Phi$ represents an aromatic group-containing compound,
    $R^6$ represents a $C_1$ to $C_4$ alkyl group, and
    k represents a value greater than or equal to 1.5.

3. The gas barrier coating composition of claim 2, wherein $R^6$ represents an alkyl group having no more than 2 carbon atoms and k represents a value greater than or equal to 1.9.

4. The gas barrier coating composition of claim 1, wherein the polyamine is m-xylylenediamine.

5. The gas barrier coating composition of claim 1, wherein the polyamine component (A) is an ungelled amine group-containing adduct comprising the reaction product of a polyamine (a) and at least one of the following:
    (b) epichlorohydrin, and
    (c) a polyepoxide having at least two glycidyl groups linked to an aromatic member.

6. The gas barrier coating composition of claim 5, wherein 10 to 80 percent of the active amine hydrogens of the ungelled amine group-containing adduct are reacted with epoxy groups of (b) and/or (c) prior to reacting the adduct with the polyepoxide component (B).

7. The gas barrier coating of claim 5, wherein the polyamine component (A) comprises an ungelled amine group-containing adduct which is the reaction product of the polyamine (a) and epichlorohydrin.

8. The gas barrier coating composition of claim 5, wherein the polyamine component (A) comprises an ungelled amine group-containing adduct which is the reaction product of the polyamine (a) and a polyepoxide having at least two glycidyl group linked to an aromatic member.

9. The gas barrier coating composition of claim 8, wherein the polyepoxide having at least two glycidyl groups linked to an aromatic member is represented by the following structure (III):

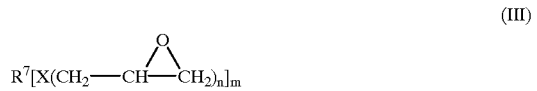
$$R^7[X(CH_2-CH\overset{O}{\overset{\diagdown}{-}}CH_2)_n]_m \quad (III)$$

where:
    $R^7$ is arylene;
    X is N, $NR^8$, $CH_2N$, $CH_2NR^8$, O, or $C(O)-O$,
        where $R^8$ is an alkyl group containing 1 to 4 carbon atoms, a cyanoethyl group or cyanopropyl group;
    n is 1 or 2; and
    m is 2 to 4.

10. The gas barrier coating composition of claim 9, wherein $R^7$ is phenylene or naphthylene.

11. The gas barrier coating composition of claim 9, wherein the polyepoxide having at least two glycidyl groups linked to an aromatic member comprises at least one of the materials selected from the group consisting of N,N,N',N'-tetrakis(oxiranylmethyl)-1,3-benzene dimethanamine, resorcinol diglycidyl ether, diglycidyl esters of phthalic acid, diglycidyl esters of isophthalic acid, diglycidyl esters of terephthalic acid and triglycidyl paraaminophenol.

12. The gas barrier coating composition of claim 5, wherein the polyamine (a) comprises m-xylylenediamine.

13. The gas barrier coating composition of claim 1, wherein the polyepoxide component (B) comprises a polyepoxide represented by the following structure (III):

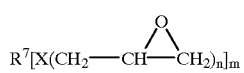  (III)

where:
R$^7$ is arylene;
X is N, NR$^8$, CH$_2$N, CH$_2$NR$^8$, O, or C(O)—O,
where R$^8$ is an alkyl group containing 1 to 4 carbon atoms, a cyanoethyl group or cyanopropyl group;
n is 1 or 2; and
m is 2 to 4.

14. The gas barrier coating composition of claim 13, wherein R$^7$ is phenylene or naphthylene.

15. The gas barrier coating composition of claim 13, wherein the polyepoxide (B) comprises at least one polyepoxide selected from the group consisting of N,N,N,N'-tetrakis(oxiranylmethyl)-1,3-benzene dimethanamine, resorcinol diglycidyl ether, diglycidyl esters of phthalic acid, diglycidyl esters of phthalic acid, diglycidyl esters of isophthalic acid, diglycidyl esters of terephthalic acid and triglycidyl paraaminophenol.

16. The gas barrier coating composition of claim 1, wherein the hydroxy-substituted aromatic compound (C) is selected from the group consisting of 2-acetamidophenol, 3-acetamidophenol, 3-aminophenol, Bisphenol A, and Bisphenol F, resorcinol, resorcinol monoacetate, methyl hydroquinone, hydroquinone, catechol, and phloroglucinol.

17. The gas barrier coating composition of claim 1, wherein (C) is a Mannich base compound comprising the reaction product of resorcinol, a carbonyl group-containing compound and an amine.

18. The gas barrier coating composition of claim 1, wherein the hydroxy-substituted aromatic compound (C) is present in an amount ranging from 0.1 to 10 weight percent based on weight of total resin solids of the coating composition.

19. The gas barrier coating composition of claim 1, wherein said composition is a thermosetting composition.

20. The gas barrier coating composition of claim 1, which forms a gas barrier coating having an oxygen permeability (P(O$_2$)) of no greater than 0.5 cubic centimeters-mil/inches$^2$/atmosphere/day.

21. The gas barrier coating composition of claim 1, wherein said composition is a thermoplastic coating composition.

22. A multi-layer packaging material having at least one gas permeable packaging material layer and at least one gas barrier material layer, said gas barrier material layer comprising:
(A) a polyamine component comprising at least one polyamine;
(B) a polyepoxide component comprising a polyepoxide having at least two glycidyl groups linked to an aromatic member; and (C) a hydroxy-substituted aromatic compound represented by the following structure (I):

HO—A—R$^1$R$^2$  (I)

wherein A is arylene; R$^1$ and R$^2$ are each independently H, OH, R$^3$, O(OC)R$^{i3}$, NH(CO)R$^{i3}$, NH$_2$, CH$_2$R$^4$, C(CH$_3$)$_2$R$^4$ or (CO)R$^5$,
where R$^3$ is alkyl; R$^{i3}$ is H or alkyl; R$^4$ is a hydroxy-substituted aromatic group or an amino group; and R$^5$ is a (di)hydroxy substituted aromatic group, provided that when R$^1$ is H or R$^3$, R$^2$ is not H or R$^3$,
wherein the hydroxy-substituted aromatic compound (C) is present in the gas barrier material layer in an amount which is sufficient to provide a gas barrier material layer having an oxygen permeability (P(O$_2$)) less than or equal to 75 percent of the P(O$_2$) of a multi-layer packaging material comprising the same gas permeable packaging material layer and the same gas barrier material layer which is free of hydroxy-substituted aromatic compounds.

23. The multi-layer packaging material of claim 22, wherein the polyamine component (A) comprises a polyamine represented by the following structure (II):

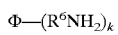  (II)

where Φ represents an aromatic group-containing compound,
R$^6$ represents a C$_1$ to C$_4$ alkyl group, and
k represents a value greater than or equal to 1.5.

24. The multi-layer packaging material of claim 23, wherein R$^6$ represents an alkyl group having no more than 2 carbon atoms and k represents a value greater than or equal to 1.9.

25. The multi-layer packaging material of claim 23, wherein the polyamine is m-xylylenediamine.

26. The multi-layer packaging material of claim 22, wherein the polyamine component (A) comprises an ungelled amine group-containing adduct comprising the reaction product of a polyamine (a) and at least one of the following:
(b) epichlorohydrin, and
(c) a polyepoxide having at least two glycidyl groups linked to an aromatic member.

27. The multi-layer packaging material of claim 26, wherein 10 to 80 percent of the active amine hydrogens of the ungelled amine group-containing adduct are reacted with epoxy groups of (b) and/or (c) prior to reacting the adduct with the polyepoxide component (B).

28. The multi-layer packaging material of claim 26, wherein the polyamine component (A) comprises an ungelled amine group-containing adduct which is the reaction product of the polyamine (a) and epichlorohydrin.

29. The multi-layer packaging material of claim 26, wherein the polyamine component (A) comprises an ungelled amine group-containing adduct which is the reaction product of the polyamine (a) and a polyepoxide having at least two glycidyl group linked to an aromatic member.

30. The multi-layer packaging material of claim 29, wherein the polyepoxide having at least two glycidyl groups linked to an aromatic member is represented by the following structure (III):

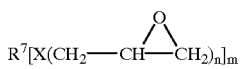

where:
R[7] is arylene;
X is N, NR[8], CH$_2$N, CH$_2$NR[8], O, or C(O)—O,
where R[8] is an alkyl group containing 1 to 4 carbon atoms, a cyanoethyl group or cyanopropyl group;
n is 1 or 2; and
m is 2 to 4.

31. The multi-layer packaging material of claim 30, wherein R[7] is phenylene or naphthylene.

32. The multi-layer packaging material of claim 30, wherein the polyepoxide having at least two glycidyl groups linked to an aromatic member comprises at least one of the materials selected from the group consisting of N,N,N',N'-tetrakis(oxiranylmethyl)-1,3-benzene dimethanamine, resorcinol diglycidyl ether, diglycidyl esters of phthalic acid, diglycidyl esters of phthalic acid, diglycidyl esters of isophthalic acid, diglycidyl esters of terephthalic acid and triglycidyl paraaminophenol.

33. The multi-layer packaging material of claim 26, wherein the polyamine (a) which reacts to form the ungelled amine group-containing adduct comprises m-xylylenediamine.

34. The multi-layer packaging material of claim 22, wherein the polyepoxide component (B) comprises a polyepoxide represented by the following structure (III):

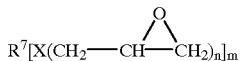

where:
R[7] is arylene,
X is N, NR[8], CH$_2$N, CH$_2$NR[8], O, or C(O)—O,
where R[8] is an alkyl group containing 1 to 4 carbon atoms, a cyanoethyl group or cyanopropyl group;
n is 1 or 2; and
m is 2 to 4.

35. The multi-layer packaging material of claim 34, wherein R[7] is phenylene or naphthylene.

36. The multi-layer packaging material of claim 34, wherein the polyepoxide (B) comprises at least one polyepoxide selected from the group consisting of N,N,N',N'-tetrakis(oxiranylmethyl)-1,3-benzene dimethanamine, resorcinol diglycidyl ether, diglycidyl esters of phthalic acid, diglycidyl esters of phthalic acid diglycidyl esters of isophthalic acid, diglycidyl esters of terephthalic acid and triglycidyl paraaminophenol.

37. The multi-layer packaging material of claim 22, wherein the hydroxy-substituted aromatic compound (C) is selected from the group consisting of 2-acetamidophenol, 3-acetamidophenol, 3-aminophenol, Bisphenol A, and Bisphenol F, resorcinol, resorcinol monoacetate, methyl hydroquinone, hydroquinone, catechol, and phloroglucinol.

38. The multi-layer packaging material of claim 22, wherein (C) is a Mannich base compound comprising the reaction product of resorcinol, a carbonyl group-containing compound and an amine.

39. The multi-layer packaging material of claim 22, wherein the hydroxy-substituted aromatic compound (C) is present in an amount ranging from 1 to 10 weight percent based on weight of total resin solids of the gas barrier material layer.

40. The multi-layer packaging material of claim 22, wherein said gas barrier material layer comprises a thermoplastic material.

41. The multi-layer packaging material of claim 22, wherein said gas barrier material layer has an oxygen permeability (P(O$_2$)) of no greater than 0.25 cubic centimeters-mil/inches$^2$/atmosphere/day.

42. The multi-layer packaging material of claim 22, wherein said gas permeable packaging material layer comprises a material selected from the group consisting of polyester, polyolefin, polyamide, cellulosic, polystyrene and polyacrylic materials.

43. The multi-layer packaging material of claim 42, wherein said gas permeable packaging material layer comprises a polyester material.

44. The multi-layer packaging material of claim 42, wherein said gas permeable packaging material layer comprises at least one of poly(ethylene terephthalate) and poly (ethylene naphthalate).

45. The multi-layer packaging material of claim 22, wherein said multi-layer packaging material is in the form of a sealable container.

46. The multi-layer packaging material of claim 45, wherein said sealable container is a beverage container.

* * * * *

UNITED STATES PATENT AND TRADEMARK OFFICE
CERTIFICATE OF CORRECTION

PATENT NO. : 6,309,757 B1
DATED : October 30, 2001
INVENTOR(S) : Leland H. Carlblom et al.

It is certified that error appears in the above-identified patent and that said Letters Patent is hereby corrected as shown below:

Column 10,
Lines 52 and 53, the phrase "0.25 cubic centimeters-mil/square inches/atmosphere/day" should read -- 0.25 cubic centimeters-mil/100 inches$^2$/atmosphere/day --.

Column 18,
Line 13, "when $R^1$ is II or $R^2$, $R^3$ is not II or $R^3$," should be replaced with -- when $R^1$ is H or $R^3$, $R^2$ is not H or $R^3$, --; and Column 20,
Lines 27-28, "0.25 cubic centimeters-mil/inches$^2$/atmosphere/day" should be replaced with -- 0.25 cubic centimeters-mil/100 inches$^2$/atmosphere/day --.

Signed and Sealed this

Thirtieth Day of April, 2002

Attest:

Attesting Officer

JAMES E. ROGAN
Director of the United States Patent and Trademark Office